United States Patent [19]

Brown

[11] 3,737,790

[45] June 5, 1973

[54] NOISE-RIDING SLICER

[75] Inventor: Bruce J. Brown, Alexandria, Va.

[73] Assignee: The United States of America as represented by the Secretary of the Navy

[22] Filed: Dec. 21, 1971

[21] Appl. No.: 210,455

[52] U.S. Cl. ..................328/165, 307/237, 328/115, 307/235

[51] Int. Cl. ..............................................H03k 5/08

[58] Field of Search..............................307/235, 237; 328/115–117, 149, 164, 165; 330/149

[56] References Cited

UNITED STATES PATENTS 3,387,222 6/1968 Hellwarth et al. ................330/149 X
2,985,836 5/1961 Hatton.............................307/235 X
3,076,145 1/1963 Copeland et al..................328/117 X
3,548,206 12/1970 Ogle et al. ........................328/116 X

*Primary Examiner*—John Zazworsky
*Attorney*—R. S. Sciascia, Arthur L. Branning and Philip Schneider

[57] ABSTRACT

A noise-slicing device for substantially eliminating the noise from an input signal consisting of signal pulses riding in a background of noise. The input signal is fed to one terminal of a voltage comparator the output of which is the output of the device. The other input to the comparator is a reference voltage which is the output of a feedback loop. The feedback loop comprises another voltage comparator, a one-shot multivibrator, a summer and an integrator. The inputs to the integrator are the input signal to the device and a proportion of the output of the integrator, which constitutes the feedback signal.

7 Claims, 2 Drawing Figures

NOISE-RIDING SLICER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a noise-slicing device and especially to a noise-slicing device which automatically adjusts the slicing level as the noise level varies.

In a signal-processing system, an important operation is the extraction of analog pulses riding in a background of noise and the conversion of these pulses into a digital signal suitable for further processing by standard 5-volt logic circuits. In the past, the analog-to-digital conversion of a signal has been accomplished by a voltage comparator with a variable voltage divider providing its reference-voltage (negative terminal) input. To operate properly, it is necessary to observe the input signal and the reference voltage ($V_{ref}$) level simultaneously on a dual-channel oscilloscope and to adjust $V_{ref}$ to a level slightly greater than the noise so that only the signal is detected. If $V_{ref}$ is set too high, the signal will not be detected. Since most signal processors have numerous channels with each channel requiring a circuit such as just described, it is necessary to properly adjust $V_{ref}$ for each circuit. In addition to these time-consuming adjustments, a serious problem with the circuit occurs under varying noise-level conditions. If $V_{ref}$ is set for a particular noise level and that noise level increases, numerous unwanted pulses, due to $V_{ref}$ "slicing" into the input noise peaks, appear at the output of the voltage comparator.

SUMMARY OF THE INVENTION

The present invention provides a solution to the above problem by automatically varying the slicing level as the peak noise level of the input signal varies, so that a constant proportion is maintained between the slicing level and the peak noise level. The device input signal is applied to a voltage comparator having as its comparison input a reference voltage which is the output of a feedback or monitoring loop. The input to the loop is the device input signal and the loop provides an output signal which is maintained at a constant proportion with respect to the peak noise level.

OBJECTS

An object of this invention is to automatically adjust a reference voltage level so as to maintain a constant proportion between it and the noise level of an input signal consisting of analog signal pulses in a background of noise.

Another object is to automatically slice the noise from a signal consisting of analog signal pulses in a background of noise and to provide a digital pulse for each incoming signal pulse regardless of variations in the noise level of the incoming signal.

Other objects, advantages and novel features of the invention will become apparent from the following detailed description of the invention when considered in conjunction with the accompanying drawings wherein:

DETAILED DESCRIPTION

Figure 1:
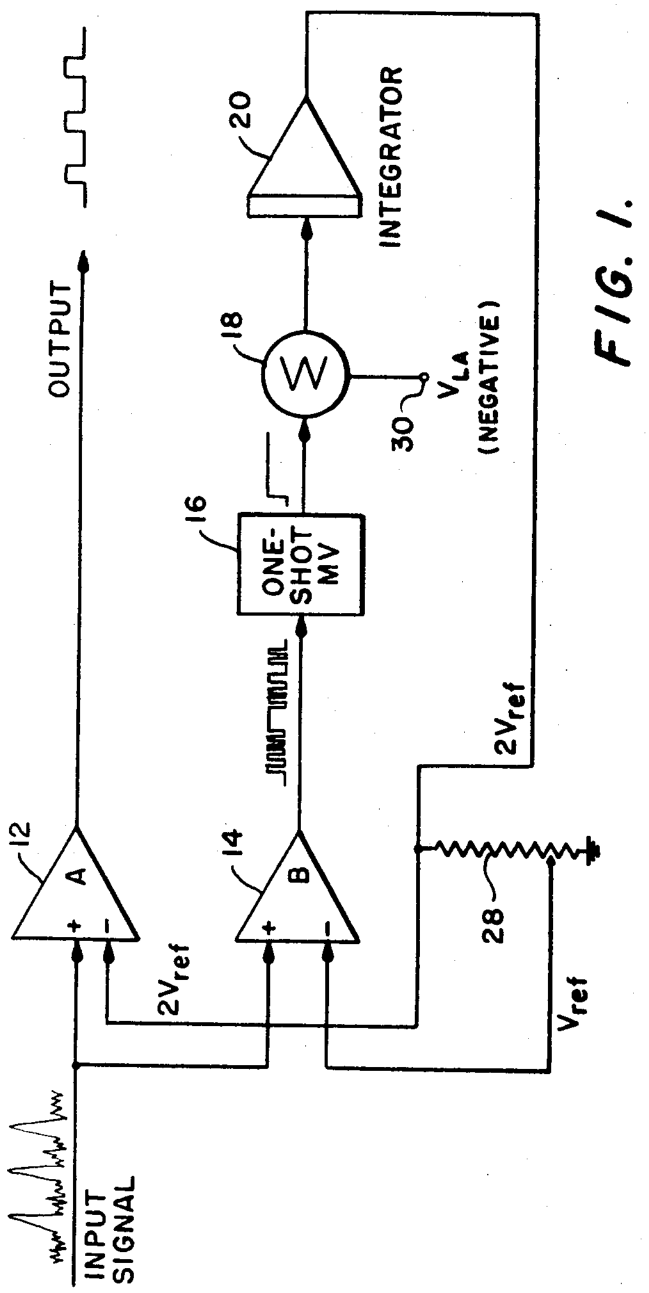
FIG. 1 is a block diagram of an embodiment of the invention.
Figure 2:
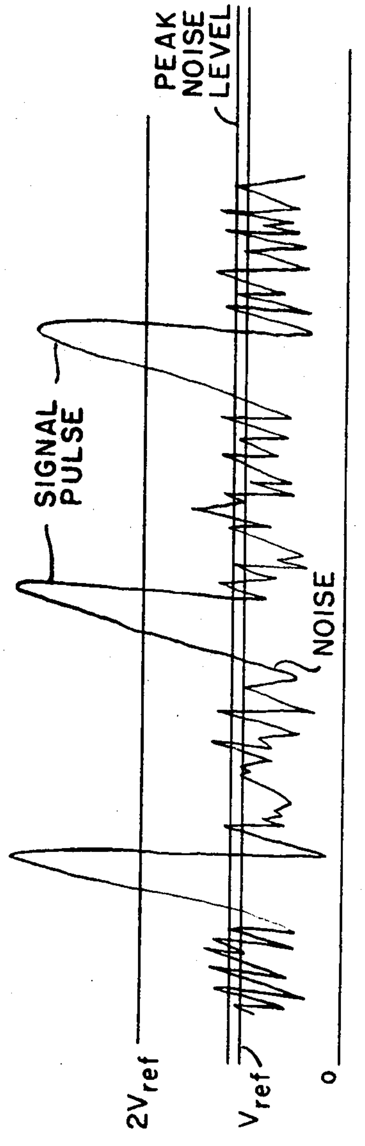
FIG. 2 is an illustration of the device input signal waveform and the reference voltage levels.

FIG. 1 illustrates an embodiment of the invention. An input signal consisting of analog signal pulses riding in a background of noise impulses is fed to the noise-slicing device. The noise consists of spikes of varying amplitude and duration. However, for any small period of time such as the time between successive signal pulses or several signal pulses, a measure of the peak noise might be said to be an average of the peak values attained by the noise spikes or it might be decided that the measure of the peak noise might simply be an arbitrary line drawn at a level such that some of the peak values occur just above the line. Whatever measure is decided upon, it will hereinafter be known as the "peak noise level".

The device input signal is fed to the positive terminal of the output comparator 12, the output of which is the output of the device, a digitalized signal exhibiting a pulse for every analog pulse signal that comes in but having a background essentially free of noise. The input at the negative terminal is a reference voltage, $2V_{ref}$, which is the output of a feedback, or monitoring, loop. The comparator 12 (as well as comparator 14) is a device which is capable of accepting a signal of either polarity as an input signal. Thus, the input signal to the device, which is applied at the terminal marked "+", may be either of positive or negative polarity. The comparator may therefore be termed a "bipolar" device.

The feedback loop comprises a feedback comparator 14, a one-shot multivibrator 16, a summer 18, an integrator 20, a voltage divider 28 and a fixed-voltage source 30 feeding a negative-polarity reference voltage, $V_{LA}$, to the summer 18. The loop monitors the device input signal and endeavors to produce a reference voltage which varies in correspondence to the variations in the peak noise level so that a constant proportion is maintained between the reference voltage level and the peak noise level.

The device input signal is fed to the positive-terminal of the feedback comparator 14 and a portion of the output signal of the feedback loop, $V_{ref}$, is fed to the negative input terminal of the comparator 14. The value of $V_{ref}$ depends on the value of $V_{1a}$, the level-adjusting voltage, which is the reference input to the summer 18. Preferably, the level of $V_{ref}$ is placed so that it is close to, but somewhat below, the highest values of the noise peaks.

The feedback comparator 14 produces an output of fixed level whenever the level of the positive-terminal input rises above the level of the negative-terminal, or reference, input. The output is thus a series of pulses of different duration and aperiodic spacing which occur whenever the noise or signal pulses rise above the $V_{ref}$ level.

The output of the comparator 14 is fed to a one-shot multivibrator (MV) 16 which produces a pulse of fixed duration whenever an input is applied to it. The period is adjusted to be longer than the time period of successive noise spikes but shorter than the period of the expected pulse signals.

Assume now that the noise peaks are well above the level of $V_{ref}$. The output of the feedback comparator 14 will be a series of closely spaced pulses corresponding to the noise spikes which exceed the $V_{ref}$ level. Thus the MV output will be a signal of fixed level (e.g., 5 Volts) since the MV will be immediately fired at the end of each period.

The MV output is fed to the summer 18 to which is also fed a negative-polarity, fixed-value, reference voltage, $V_{LA}$, known as the level-adjust voltage because its value determines the level at which the feedback loop will try to maintain $V_{ref}$. (The value of $V_{LA}$ may be about one-fifth the value of the one-shot MV 16; since the output of the MV is about 5 Volts, $V_{LA}$ may be about 1 Volt.) $V_{LA}$ is added to the MV output (actually, since $V_{LA}$ is negative, it is subtracted from the MV output) and the summer output is integrated by the integrator 20, causing the integrator output to become more and more positive. The integrator output, designated $2V_{ref}$, is fed to the voltage divider 28 where a portion, (in this case, one half) is fed to the negative terminal of the reference-voltage comparator 14. The integrator 20 acts to smooth the output of the MV16, which comprises a series of pulses, into a voltage (2 $V_{ref}$) whose level varies smoothly and does not have discontinuities. It acts like a low pass filter.

It should be noted that the duration of the output signal from the MV16 depends on the rate of fluctuation of the input signal to the entire device (or to the output comparator 12). Thus, the level of the integrator output (i.e., the reference, or feedback, signal) depends on the rate of fluctuation of the input signal to the device.

As the integrator output and consequently $V_{ref}$, rises, fewer of the noise peaks rise above the $V_{ref}$ level. The output of the comparator 14 has fewer pulses and the MV 16 is not always fired immediately at the end of its period, so that the MV output is no longer substantially a continuous output but becomes a series of pulses with a longer interval between them as the integrator output voltage rises.

However, a greater interval between the MV output pulses means a smaller average value from which $V_{LA}$ is substracted. Therefore, the integrator output level tends to go down. These conflicting tendencies keep the integrator output $2V_{ref}$, and therefore $V_{ref}$, at some constant level as long as the peak noise level remains the same, and tend to keep a constant difference between $V_{ref}$ and the peak noise level if the latter varies.

The reference level at the input of the output-comparator 12 does not necessarily have to be $2V_{ref}$. The level must simply be high enough above the peak noise level that very few noise peaks ever exceed it, since this is the noise-slicing level. It must also be below the peak value of the signal pulses so that the signal pulses will activate the output-comparator 12.

The frequency of the occurrence of the noise generated pulses at the output of the feedback comparator 14 depends on the level of $V_{ref}$ at its negative input terminals.

The frequency of the occurrence of the noise-generated pulses at the output of the feedback comparator 14 determines the fraction of time during each signal pulse period over which the high level of the MV output extends.

The fraction of the period over which the high level of the MV extends (or the duration of MV output with respect to the signal-pulse period) is partially determinative of the amplitude of the integrator output, i.e., the level of $V_{ref}$, which is also a function of the value of the level-adjust voltage, $V_{LA}$.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A noise-slicing device for automatically substantially eliminating the noise impulses from an input signal applied thereto consisting of signal pulses in a background of noise comprising, in combination:

comparison means, having terminal means to which said device input signal and a reference voltage are applied as inputs, for comparing said input signal with said reference voltage and providing an output signal only when said input voltage rises above the level of said reference voltage; and feedback means, to which said device input signal is applied, for producing said reference voltage and automatically maintaining it at a predetermined proportion of the peak noise level of said device input signal, a portion of said reference voltage being fed back as an input reference level to said feedback means.

2. A noise-slicing device as in claim 1, wherein said feedback means comprises a feedback loop including:

comparator means, receiving said device input signal and said portion of said reference voltage as input signals, for comparing its two input signals and providing a fixed-level output signal whenever said device input signal rises above the level of its input reference voltage;

fixed-level-output means, receiving the output of said comparator means as an input, for providing for a fixed period a fixed-level output signal when triggered by a signal at its input, said fixed period covering the time duration of several noise impulses but being less than the period of the signal pulses of the device input signal;

means for supplying a fixed, negative-polarity, level-adjusting voltage;

summing means, receiving the output of said fixed-level-output means and said level-adjusting voltage as inputs, for summing its two input voltages; and integrating means, receiving the output of said summing means as an input, for integrating its input signal and producing an output signal which constitutes said reference voltage.

3. A device as in claim 1, wherein said portion of said reference voltage is one-half thereof.

4. A device as in claim 2, wherein the level of said level-adjusting voltage determines the level at which said reference voltage is maintained by said feedback loop.

5. A noise-slicing device for automatically substantially eliminating the noise impulses from an input signal applied thereto consisting of signal pulses in a background of noise comprising, in combination:

an output comparator, receiving said device input signal and a reference voltage as input signals, for comparing its two input signals and providing an output signal whenever said device input signal rises above the level of its input reference level;

a feedback comparator, receiving said device input signal and a portion of said reference voltage as input signals, for comparing its two input signals and providing an output signal whenever said device input signal rises above the level of its input reference voltage;

a one-shot multivibrator, receiving the output of said feedback voltage comparator as an input, and providing for a fixed period a fixed-level output signal when triggered by a signal at its input, said fixed period covering the time duration of several noise impulses but being less than the period of the signal pulses of the device input signal;

a fixed-voltage supply source supplying a fixed voltage of negative polarity;

a summer to which the output of said multivibrator and said fixed voltage are fed as inputs;

an integrator receiving the summed signal as an input and providing said reference voltage as its output signal; and voltage dividing means, to which said reference voltage is applied as an input, providing a portion of its input as an output to said feedback voltage comparator.

6. A noise-slicing device for automatically substantially eliminating the noise impulses from an input signal applied thereto consisting of signal pulses in a background of noise comprising, in combination:

comparison means, having terminal means to which said device input signal and a reference voltage are applied as inputs for comparing said input signal with said reference voltage and providing an output signal only when said input voltage rises above the level of said reference voltage; and continuously operating feedback means, to which said device input signal is applied, for producing said reference voltage and automatically maintaining it at a predetermined proportion of the peak noise level of said device input signal, a portion of said reference voltage being fed back as an input reference level to said feedback means.

7. A noise-slicing device as in claim 6, said feedback means responding to the rate of fluctuation of said device input signal, so that the level of said reference voltage is dependent on the rate of fluctuation of the device input signal.

* * * * *